US012548357B2

United States Patent
Tseng et al.

(10) Patent No.: US 12,548,357 B2
(45) Date of Patent: Feb. 10, 2026

(54) GEOMETRY-AWARE SEMANTICS SEGMENTATION WITH GRAVITY-NORMAL REGULARIZATION

(71) Applicant: QUALCOMM Incorporated, San Diego, CA (US)

(72) Inventors: Ching-Wei Tseng, Hsinchu (TW); Mohsen Ghafoorian, Diemen (NL); Nikhil Khullar, San Diego, CA (US); Yu Fu, Taipei (TW); Shang-Lun Lee, Taipei (TW); Abhijeet Bisain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 18/463,068

(22) Filed: Sep. 7, 2023

(65) Prior Publication Data
US 2025/0086995 A1 Mar. 13, 2025

(51) Int. Cl.
*G06V 20/70* (2022.01)
*G06T 7/11* (2017.01)

(52) U.S. Cl.
CPC ............... *G06V 20/70* (2022.01); *G06T 7/11* (2017.01)

(58) Field of Classification Search
CPC ........ G06V 20/70; G06V 10/82; G06V 20/20; G06V 20/647; G06V 20/36; G06T 7/11
USPC ........................................................ 382/103
See application file for complete search history.

(56) References Cited

U.S. PATENT DOCUMENTS

| 11,908,036 B2* | 2/2024 | Wang | G06T 7/11 |
| 2021/0142497 A1* | 5/2021 | Pugh | G06T 7/543 |
| 2022/0156971 A1 | 5/2022 | Guizilini et al. | |

OTHER PUBLICATIONS

Fei X., et al., "Geo-Supervised Visual Depth Prediction", IEEE Robotics and Automation Letters, IEEE, vol. 4, No. 2, Apr. 1, 2019, XP011711179, pp. 1661-1668, Sections III-IV.
International Search Report and Written Opinion—PCT/US2024/035469—ISA/EPO—Oct. 17, 2024.
Rusu R.B., "Semantic 3D Object Maps for Everyday Manipulation in Human Living Environments Dissertation", Sep. 18, 2009, pp. 1-284, XP093121350, 266 pages, The Whole Document.

* cited by examiner

*Primary Examiner* — Charlotte M Baker
*Assistant Examiner* — Dustin Bilodeau
(74) *Attorney, Agent, or Firm* — Satheesh Kumar Karra; Polsinelli LLP

(57) ABSTRACT

Disclosed are systems and techniques for image processing. For example, a computing device can generate, using a multi-task model, a segmentation output and a normal output based on image(s) of a scene and a gravity vector for the scene. The computing device can learn semantic prediction(s) based on comparing the segmentation output to at least one ground truth semantic segmentation map. The computing device can also learn normal prediction(s) based on comparing the normal output to at least one ground truth normal map. The computing device can extract a semantics normal from the semantic prediction(s) and the normal prediction(s). The computing device can optimize a regularization loss based on the semantics normal and the gravity vector for the scene by learning gravity-normal regularization(s) for the scene. The computing device can determine final semantic labels for regions of the scene based on the gravity-normal regularization(s).

25 Claims, 12 Drawing Sheets

GEOMETRY-AWARE SEMANTICS SEGMENTATION WITH GRAVITY-NORMAL REGULARIZATION

FIELD OF THE DISCLOSURE

The present disclosure generally relates to image processing. For example, aspects of the present disclosure relate to systems and techniques for providing geometry-aware semantics segmentation with gravity-normal regularization.

BACKGROUND OF THE DISCLOSURE

A camera is a device that receives light and captures image frames, such as still images or video frames, using an image sensor. Cameras may include one or more processors, such as image signal processors (ISPs), that can process one or more image frames captured by an image sensor. For example, a raw image frame captured by an image sensor can be processed by an image signal processor (ISP) to generate a final image. Cameras can be configured with a variety of image capture and image processing settings to alter the appearance of an image. The increasing versatility of digital camera products has allowed digital cameras to be integrated into a wide array of devices and has expanded their use to different applications. For example, extended reality (XR) devices, phones, drones, cars, computers, televisions, and many other devices today are often equipped with camera devices.

Extended reality technologies can be used to present virtual content to users, and/or can combine real environments from the physical world and virtual environments to provide users with extended reality (XR) experiences. Extended reality systems can allow users to experience XR environments by overlaying virtual content onto images of a real-world environment, which can be viewed by a user through an XR device (e.g., a head-mounted display, extended reality glasses, or other devices). An XR device is a device that displays an environment to a user, for example through a head-mounted display (HMD) or other device. The environment is at least partially different from the real-world environment in which the user is in. XR devices typically use three-dimensional (3D) semantic reconstruction to prevent the XR device (e.g., using an HMD) users (or robots) from colliding with boundaries of their environment within a scene (e.g., such as physical walls or objects within a room). However, sometimes, the 3D semantic reconstruction provides inaccurate semantic labels of the boundaries, which can lead to misunderstandings of the scene.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Systems and techniques are described for image processing. According to at least one illustrative example, an apparatus for image processing is provided. The apparatus includes at least one memory and at least one processor coupled to the at least one memory and configured to: generate, using a multi-task model, a segmentation output and a normal output based on one or more images of a scene and a gravity vector for the scene; learn one or more semantic predictions based on comparing the segmentation output to at least one ground truth semantic segmentation map; learn one or more normal predictions based on comparing the normal output to at least one ground truth normal map; extract a semantics normal from the one or more semantic predictions and the one or more normal predictions; optimize a regularization loss based on the semantics normal and the gravity vector for the scene by learning one or more gravity-normal regularizations for the scene; and determine final semantic labels for regions of the scene based on the one or more gravity-normal regularizations.

In another illustrative example, a method for image processing is provided. The method includes: generating, using a multi-task model, a segmentation output and a normal output based on one or more images of a scene and a gravity vector for the scene; learning one or more semantic predictions based on comparing the segmentation output to at least one ground truth semantic segmentation map; learning one or more normal predictions based on comparing the normal output to at least one ground truth normal map; extracting a semantics normal from the one or more semantic predictions and the one or more normal predictions; optimizing a regularization loss based on the semantics normal and the gravity vector for the scene by learning one or more gravity-normal regularizations for the scene; and determining final semantic labels for regions of the scene based on the one or more gravity-normal regularizations.

In another illustrative example, a non-transitory computer readable medium is provided that has stored thereon instructions that, when executed by one or more processors, cause the processors to: generate, using a multi-task model, a segmentation output and a normal output based on one or more images of a scene and a gravity vector for the scene; learn one or more semantic predictions based on comparing the segmentation output to at least one ground truth semantic segmentation map; learn one or more normal predictions based on comparing the normal output to at least one ground truth normal map; extract a semantics normal from the one or more semantic predictions and the one or more normal predictions; optimize a regularization loss based on the semantics normal and the gravity vector for the scene by learning one or more gravity-normal regularizations for the scene; and determine final semantic labels for regions of the scene based on the one or more gravity-normal regularizations.

In another illustrative example, an apparatus for image processing is provided that includes: means for generating, using a multi-task model, a segmentation output and a normal output based on one or more images of a scene and a gravity vector for the scene; means for learning one or more semantic predictions based on comparing the segmentation output to at least one ground truth semantic segmentation map; means for learning one or more normal predictions based on comparing the normal output to at least one ground truth normal map; means for extracting a semantics normal from the one or more semantic predictions and the one or more normal predictions; means for optimizing a regularization loss based on the semantics normal and the gravity vector for the scene by learning one or more gravity-normal regularizations for the scene; and means for determining final semantic labels for regions of the scene based on the one or more gravity-normal regularizations.

Aspects generally include a method, apparatus, system, computer program product, non-transitory computer-readable medium, user device, image processing device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

In some aspects, the device can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
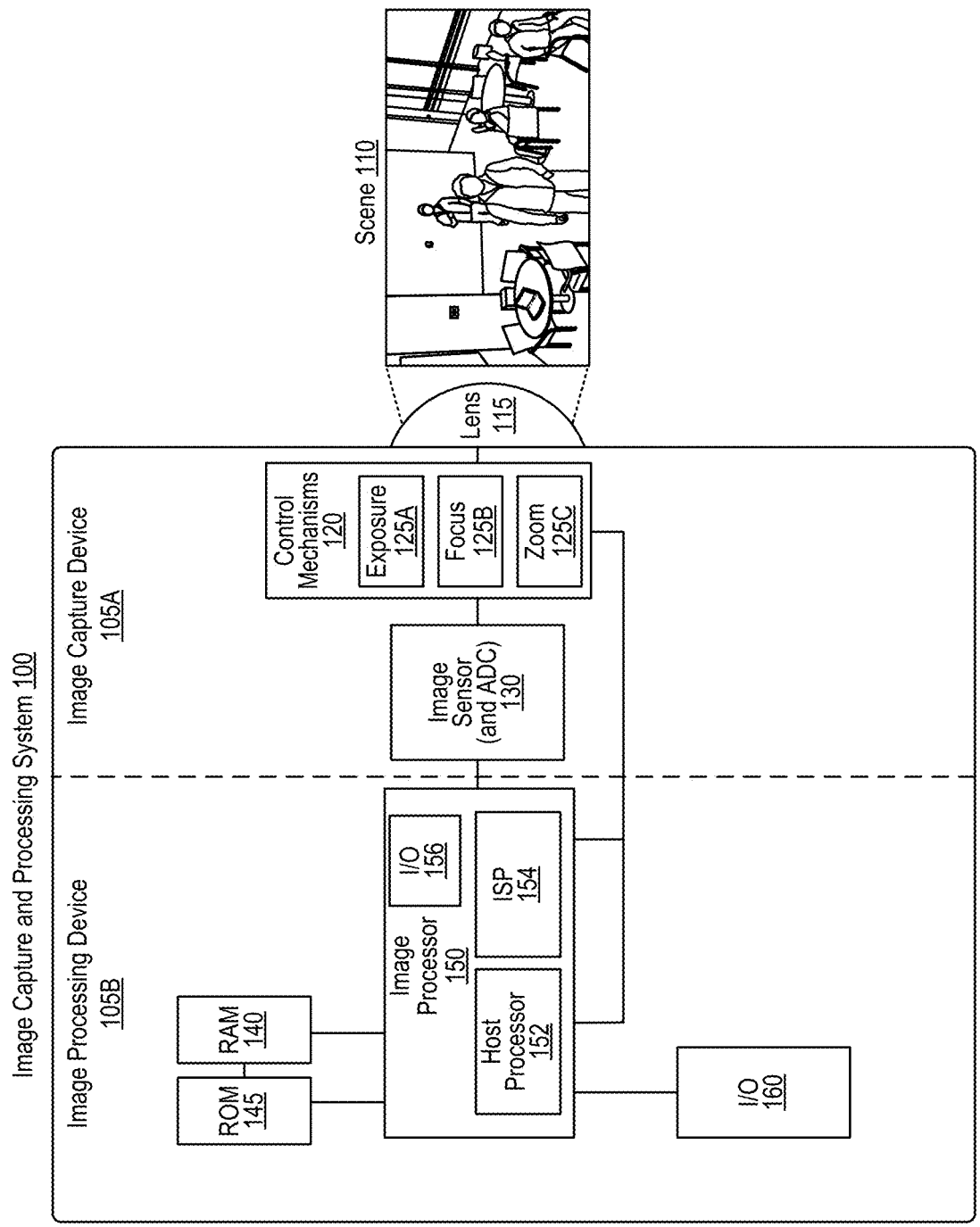
FIG. 1 is a block diagram illustrating an architecture of an image capture and processing system, in accordance with some aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Computing device can use three-dimensional (3D) semantic reconstruction (e.g., semantic segmentation) for scene understanding (e.g., to understand the physical environment of a scene). Examples of such devices include extended reality (XR) devices, phones, drones, cars, computers, televisions, and many other devices today are often equipped with camera devices. For instance, XR technologies can be used to present virtual content to users, and/or can combine real environments from the physical world and virtual environments to provide users with XR experiences (e.g., virtual reality (VR), augmented reality (AR), mixed reality (MR), and/or other similar experiences).

Scene understanding is the process of using an image (or a set of images) of a scene to obtain semantic knowledge of contents (e.g., objects) and/or boundaries (e.g., boundary regions) of the scene. One aspect of scene understanding is determining the objects and/or boundaries within an image. This determination may be performed at the pixel level through semantic segmentation. For each pixel in an image, semantic segmentation estimates the probability that the pixel belongs to a set of defined object or region (e.g., boundary region) classes. Each pixel can then be assigned a label (e.g., a semantic label) by finding the most likely class for that pixel. Pixel-wise predictions are useful because they allow for operations to be performed on only those pixels that belong to a specific class.

Existing approaches to semantic segmentation typically use neural networks, such as deep convolutional neural networks (DCNs). DCNs are a type of machine learning model that maps an input to an output. In the context of semantic segmentation, the input is an image, and the output a set of pixel-wise predictions. Currently, semantic segmentation algorithms are typically assessed by the resulting mean intersection over union (mIoU) on the output semantic segmentation dataset. The IoU is calculated for each class at the pixel-level as 100*[(true–positives)/(true–positives+false–negatives+false-positives)]. The "true-positives" are pixels that belong to the class, and are correctly predicted as the class. The "false-negatives" are pixels that belong to the class, but are incorrectly predicted as a different class. The "false-positives" are pixels that belong to a different class, but are predicted as the class. The IoU is a value between zero (0) and one-hundred (100), where a larger value indicates a more accurate semantic segmentation. The mIoU is the mean value across all of the classes in the dataset.

In some cases, a computing device (e.g., an XR device such as a head-mounted device (HMD), robotics device, etc.) can use 3D semantic reconstruction (e.g., semantic segmentation) to prevent the computing device (and/or a user of the computing device) from colliding with boundaries of their environment within a scene (e.g., such as physical walls or objects within a room). However, in some cases (e.g., in cases of a tilted camera), the 3D semantic reconstruction provides inaccurate semantic labels (e.g., semantic classes) of the boundaries, which can lead to misunderstandings of the scene.

Various camera orientations and viewing directions can challenge the robustness of the semantic predictions. For example, extreme poses, viewing directions, and tilted images from a camera can lead to inaccurate semantic results, which may affect various scene-understanding tasks. For example, extreme rotations (e.g., in both pitch and roll) of a camera can be detrimental to scene understanding because the tilted images can have ambiguity and lack of contextual information that can cause the semantic segmentation methods to produce an inaccurate semantics output. Some existing solutions to overcome the issues of tilted images involve pre-processing the tilted images to un-tilt the images. However, these solutions require a longer processing time and can still lead to inaccurate semantic predictions.

The lack of 3D knowledge in two-dimensional (2D) semantic applications, such as semantic segmentation predictions from 2D color images without having sufficient 3D information, has limited space to improve. Utilizing 3D information, such as depth data and normal data (e.g., one or more normal vectors representing surface normals), for existing semantic segmentation methods can often require extra complexity and run-time for the whole image processing pipeline. As such, an improved technique to provide an accurate 3D semantic reconstruction of a scene can be beneficial.

In one or more aspects of the present disclosure, systems, apparatuses, methods (also referred to as processes), and computer-readable media (collectively referred to herein as "systems and techniques") are described herein that provide neural geometry-aware semantics segmentation with gravity-normal regularization. The systems and techniques can employ the use of a gravity vector of a scene to provide 3D information to the semantic segmentation method to increase the robustness of the method. The systems and techniques can simultaneously determine (e.g., only during a training stage) normal predictions (e.g., predictions of normal vectors for classes, such as regions, which may include a floor, a ceiling, and walls) of the scene (e.g., of a room) and determine semantic predictions (e.g., semantic labels for the classes) for the scene.

The systems and techniques can employ a gravity-normal regularization that uses the gravity vector (e.g., which is perpendicular to the floor) as a parameter. The gravity-normal regularization involves the relationship between a semantics normal (e.g., normal vectors associated with regions of a scene) and the gravity vector for the scene. The semantics normal can also be referred to as a normal of semantics in some cases. In one or more examples, the gravity vector for the scene can be obtained from one or more inertial measurement unit (IMU) sensors on a camera, while one or more image sensors on the camera are capturing the image(s) of the scene.

Additional aspects of the present disclosure are described in more detail below.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 7:
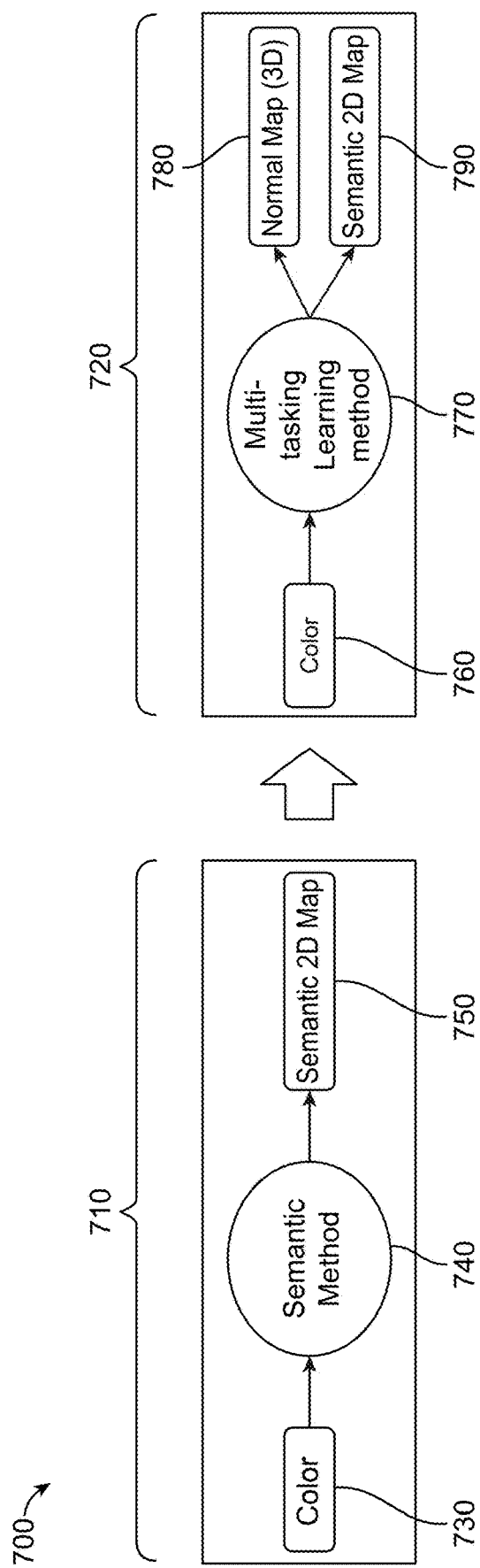
FIG. 7 is a diagram illustrating another example of a challenge on the robustness of semantic segmentation for scene understanding, in accordance with some aspects of the present disclosure.

The image processor 150 may include one or more processors, such as one or more image signal processors (ISPs) (including ISP 154), one or more host processors (including host processor 152), and/or one or more of any other type of processor 710 discussed with respect to the computing system 700 of FIG. 7. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140, read-only memory (ROM) 145, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some cases, images captured by the image capture and processing system 100 may be processed by neural networks and/or machine learning (ML) systems. A neural network is an example of an ML system, and a neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input. The connections between layers of a neural network may be fully connected or locally connected. Various examples of neural network architectures are described below with respect to FIG. 2A-FIG. 3.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
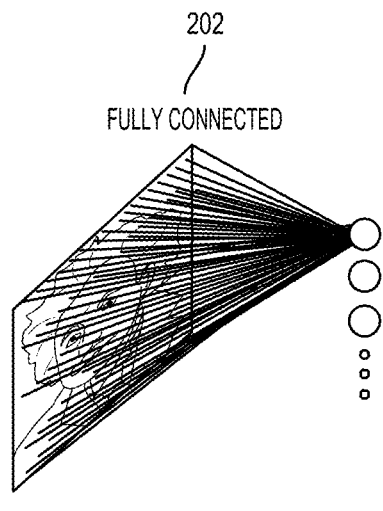
FIG. 2A-2D and FIG. 3 are diagrams illustrating examples of neural networks, in accordance with some aspects of the present disclosure.
Figure 2B:
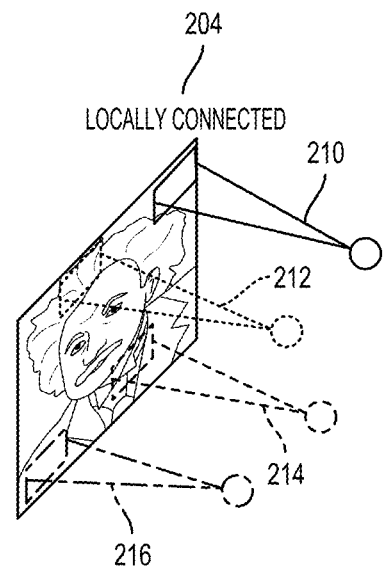

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
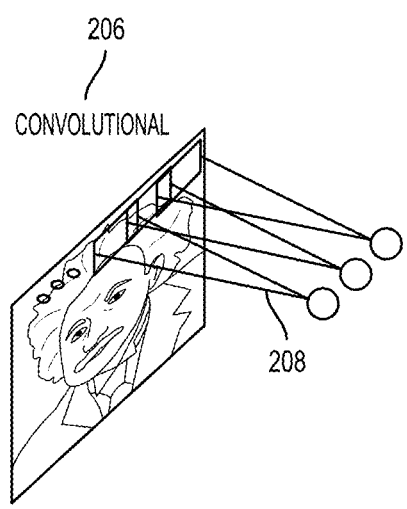

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
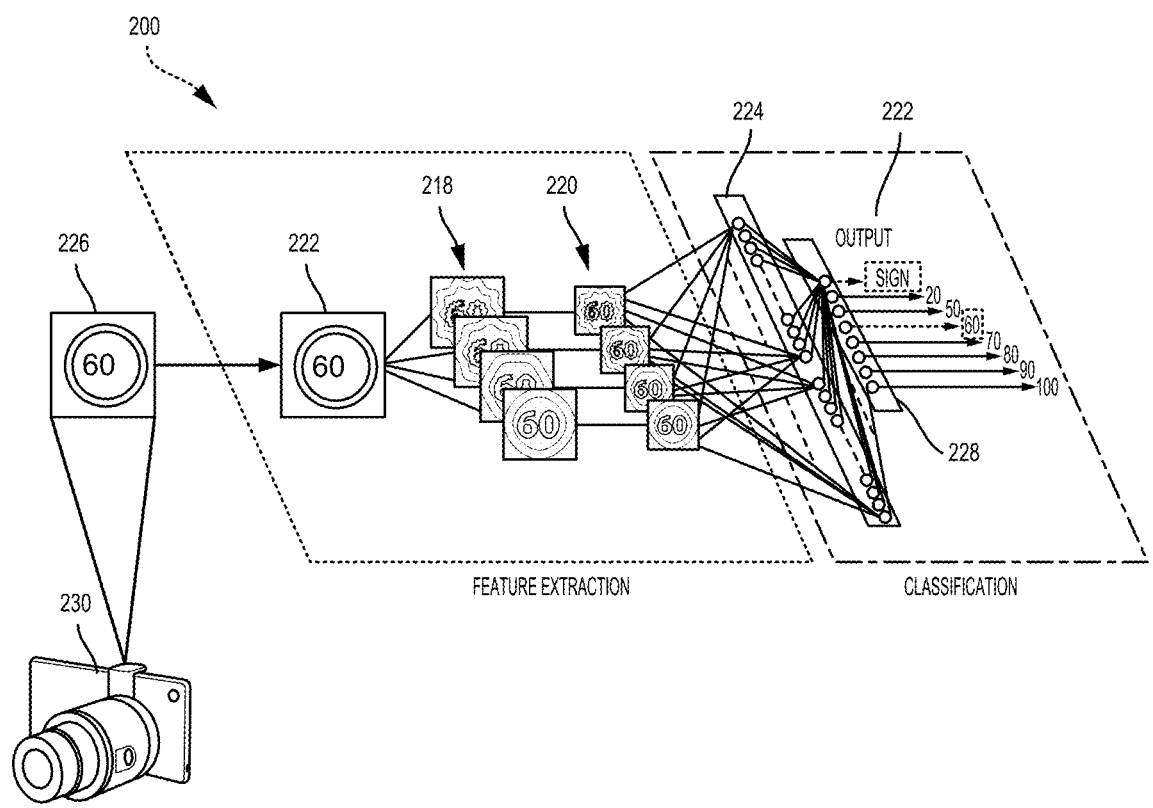

One type of convolutional neural network is a deep convolutional network (DCN). FIG. 2D illustrates a detailed example of a DCN 200 designed to recognize visual features from an image 226 input from an image capturing device 230, such as an image capture and processing system 100 of FIG. 1. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., feature maps 220) receiving input from a range of neurons in the previous layer (e.g., feature maps 218) and from each of the multiple channels. The values in the feature map may be further processed with a non-linearity, such as a rectification, max (0,x). Values from adjacent neurons may be further pooled, which corresponds to down sampling, and may provide additional local invariance and dimensionality reduction.

Figure 3:
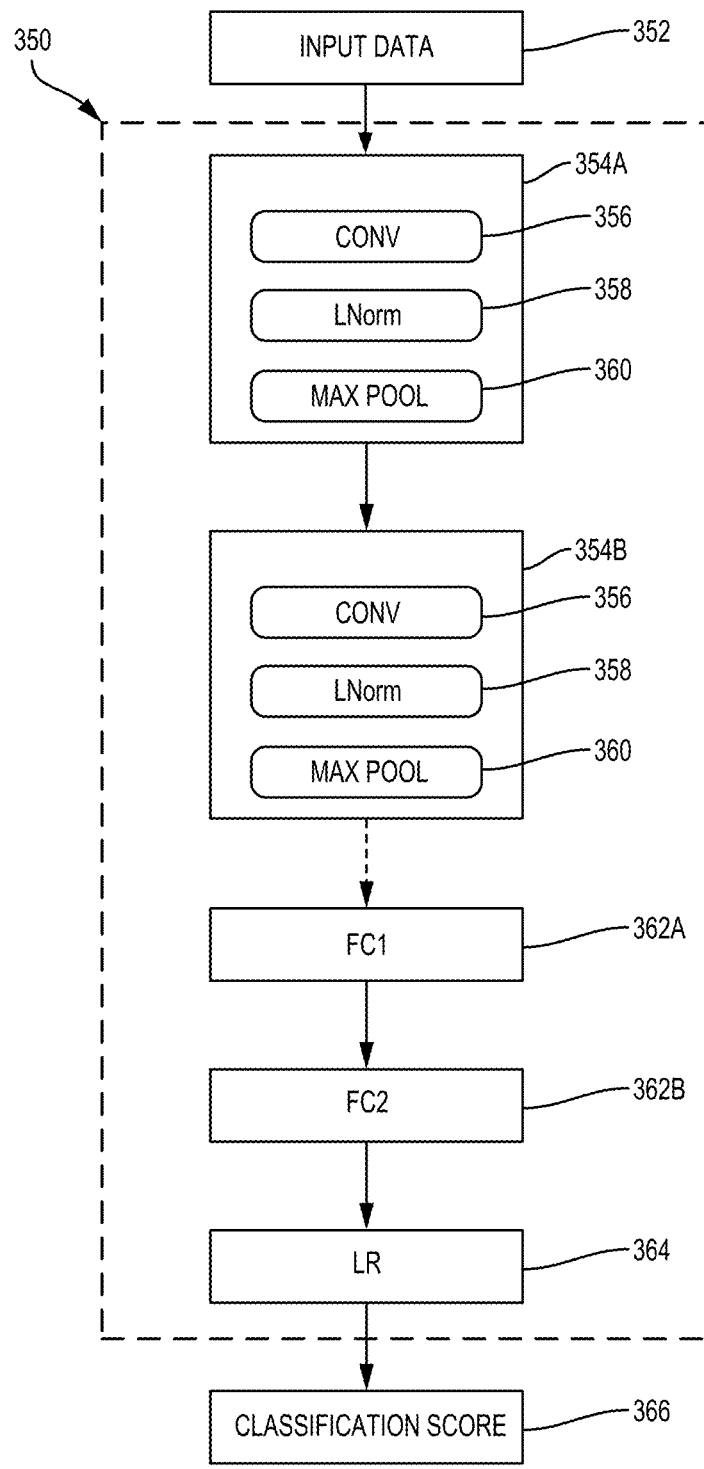

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360. Of note, the layers illustrated with respect to convolution blocks 354A and 354B are examples of layers that may be included in a convolution layer and are not intended to be limiting and other types of layers may be included in any order.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., convolution blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

Figure 11:
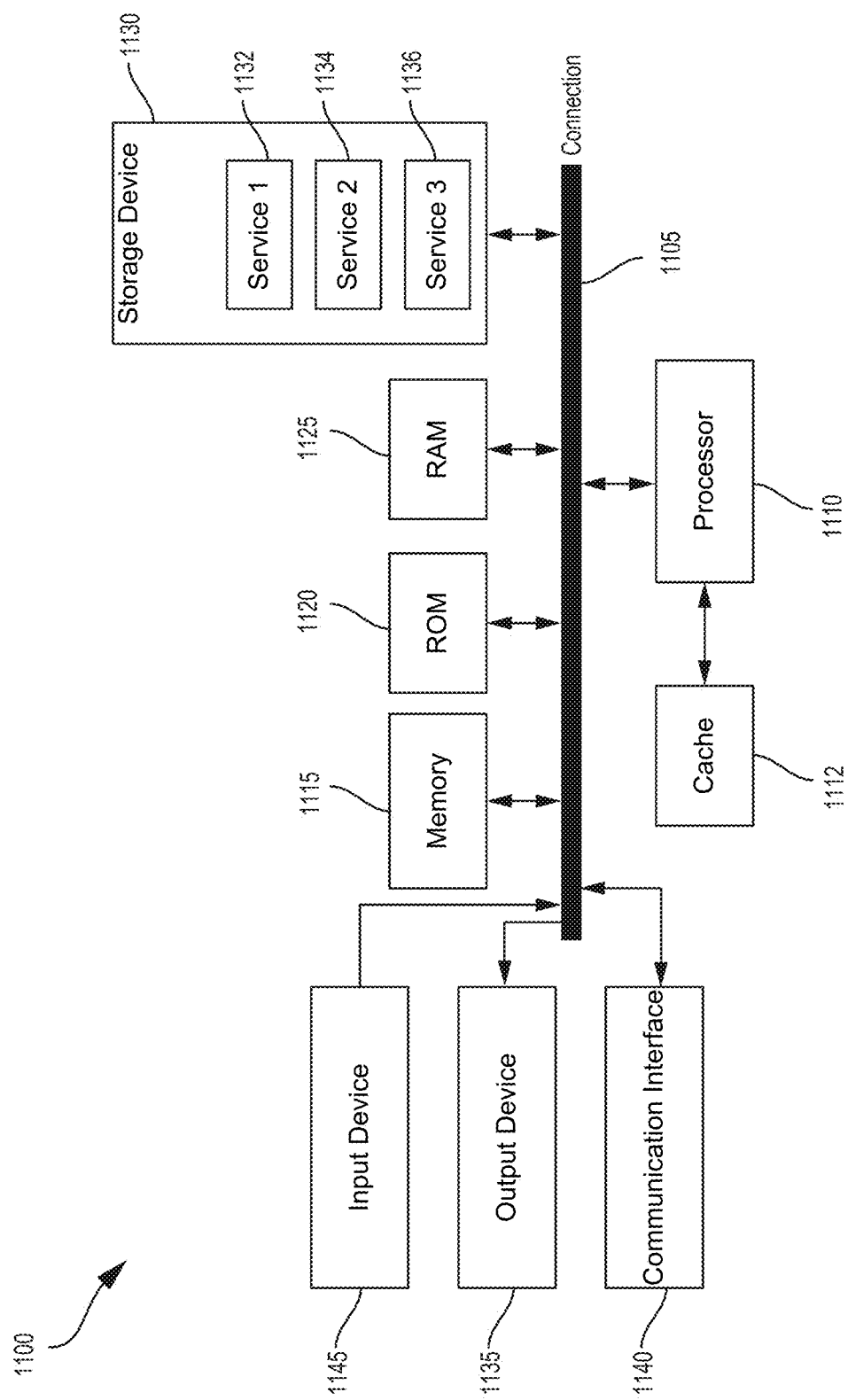
FIG. 11 is a block diagram illustrating an example of a computing system for implementing certain aspects of the present technology, in accordance with some aspects of the present disclosure.

The parallel filter banks, for example, of a deep convolutional network may be loaded on a processor such as a CPU or GPU, or any other type of processor 1110 discussed with respect to the computing system 1100 of FIG. 11 to achieve high performance and low power consumption. In alternative aspects, the parallel filter banks may be loaded on a DSP or an ISP of the computing system 1100 of FIG. 11. In addition, the deep convolutional network 350 may access other processing blocks that may be present on the computing system 1100 of FIG. 11, such as sensor processor and navigation module, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362A, 362B. 364 of the deep convolutional network 350 are weights (not shown) that are to be updated. The output of each of the layers (e.g., 356, 358, 360, 362A, 362B, 364) may serve as an input of a succeeding one of the layers (e.g., 356, 358, 360, 362A, 362B, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

In some cases, one or more convolutional networks, such as a DCN, may be incorporated into more complex ML networks. As an example, as indicated above, the deep convolutional network 350 may output probabilities that an input data, such as an image, includes certain features. The deep convolutional network 350 may then be modified to extract (e.g., output) certain features. Additionally, DCNs may be added to extract other features as well. This set of DCNs may function as feature extractors to identify features in an image. In some cases, feature extractors may be used as a backbone for additional ML network components to perform further operations, such as image segmentation.

As previously mentioned, the increasing versatility of digital camera products has allowed digital cameras to be integrated into a wide array of devices and has expanded their use to different applications. For one or more examples, XR devices, phones, drones, cars, computers, televisions, and many other devices are often equipped with camera devices. The camera devices can allow for users to capture (e.g., obtain) images and/or video (e.g., including frames of images) from any system equipped with a camera device. The images and/or videos may be captured for various different uses, which may include, but are not limited to, recreational use, professional photography, surveillance, and automation, among other applications. Moreover, camera devices are increasingly equipped with specific functionalities for modifying images or creating artistic effects on the images. In one or more examples, many camera devices are equipped with image processing capabilities for generating different effects on captured images.

Extended reality technologies may be used to present virtual content to users, and/or may combine real environments from the physical world and virtual environments to provide users with XR experiences. The term XR can include VR, AR, MR, and the like. Extended reality systems may allow users to experience XR environments by overlaying virtual content onto images of a real-world environment, which can be viewed by a user through an XR device (e.g., a head-mounted display, extended reality glasses, or other devices). An XR device is a device that displays an environment to a user, for example through an HMD or other display device. The displayed environment is at least partially different from the real-world environment (e.g., a room) in which the user is in. Generally, the user may change their view of the environment interactively, for example by tilting or moving the HMD or other device.

In one or more examples, an XR device may include a "see-through" display that allows the user to see their real-world environment based on light from the real-world environment passing through the display. In some examples, an XR device may include a "pass-through" display that allows the user to see their real-world environment, or a virtual environment based on their real-world environment, based on a view of the environment being captured by one or more cameras and displayed on the display. "See-through" or "pass-through" XR devices may be worn by users, while the users are engaged in activities in their real-world environment.

While the goal of many XR devices is to create realistic, interactive, and fully immersive XR environments, XR devices should also ensure that virtual content does not create potentially dangerous situations for users, or otherwise prevent users from properly interacting with the real-world environment. XR devices typically use 3D semantic reconstruction (e.g., semantic segmentation) for scene understanding (e.g., to understand the real-world physical environment of a scene).

Scene understanding is the process of using an image (or a set of images) of a scene to obtain semantic knowledge of contents (e.g., objects) and/or boundaries (e.g., boundary regions) of the scene. One aspect of scene understanding is determining the objects and/or boundaries within an image. This determination can be performed at the pixel level through semantic segmentation. For each pixel in an image, semantic segmentation estimates the probability that the pixel belongs to a set of defined object or region (e.g., boundary region) classes. Each pixel can then be assigned a label (e.g., a semantic label) by finding the most likely class for that pixel. Pixel-wise predictions are useful because they can allow for operations to be performed on only those pixels that belong to a specific class.

Existing approaches to semantic segmentation typically use neural networks, such as DCNs. DCNs are a type of machine learning model that maps an input to an output. In the context of semantic segmentation, the input is an image, and the output a set of pixel-wise predictions. Currently, semantic segmentation algorithms are generally assessed by the resulting mIoU on the output semantic segmentation dataset. The IoU is calculated for each class at the pixel-level as 100*[(true−positives)/(true−positives+false−negatives+false−positives)]. The "true-positives" are pixels that belong to the class, and are correctly predicted as the class; the "false-negatives" are pixels that belong to the class, but are incorrectly predicted as a different class; and the "false-positives" are pixels that belong to a different class, but are predicted as the class. The IoU is a value between zero and one-hundred, where a larger value indicates a more accurate semantic segmentation. The mIoU is the mean value across all of the classes in the dataset.

Figure 4:
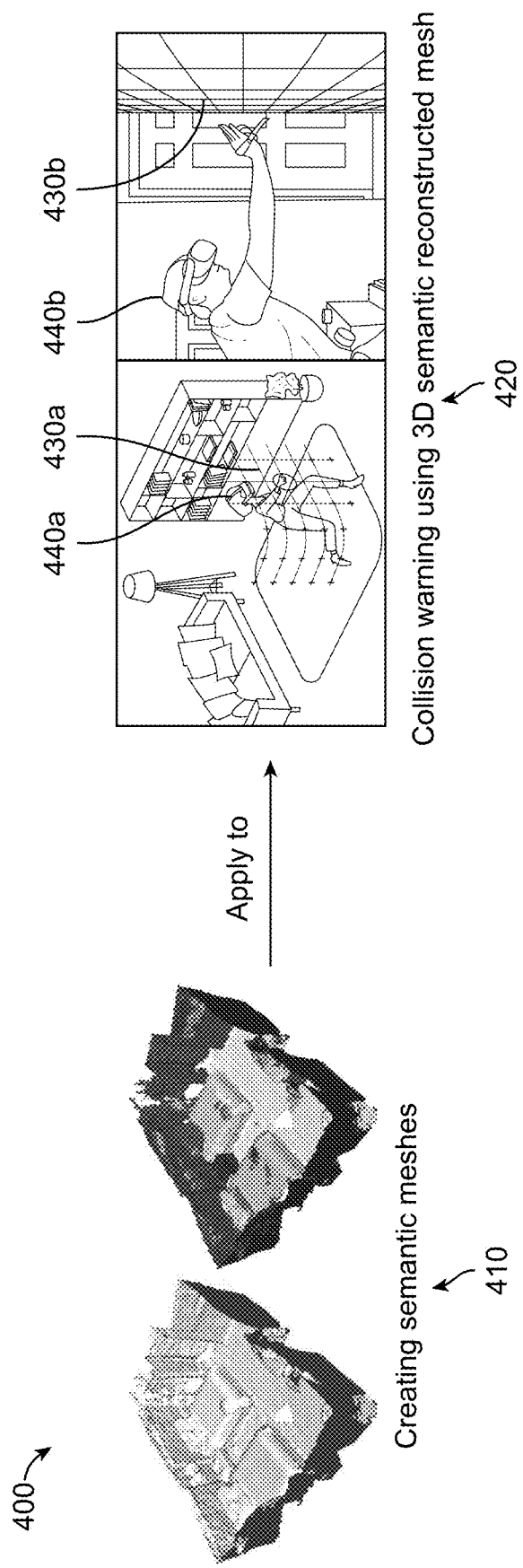
FIG. 4 is a diagram illustrating an example use case for using semantic segmentation for scene understanding, in accordance with some aspects of the present disclosure.

In some cases, XR devices can use 3D semantic reconstruction (e.g., semantic segmentation) to prevent the XR device (e.g., an HMD) user (or robot) from colliding with boundaries of their environment within a scene (e.g., such as physical walls or objects within a room). FIG. 4 shows an example of a use case 400 for semantic segmentation for scene understanding. In particular, FIG. 4 shows a use case 400 for semantic segmentation for scene understanding for providing collision warnings to users 440a, 440b for XR (e.g., VR or MR) user interactive scenarios, such as for gaming. In FIG. 4, 3D semantic reconstruction (e.g., semantic segmentation) is performed (e.g., by one or more processors, such as ISP 150 of FIG. 5 or processor 1110 of FIG. 11) using an image of a scene (e.g., a room) to obtain semantic knowledge of contents (e.g., objects) and/or boundaries (e.g., boundary regions, such as walls, a ceiling, and a floor) of the scene. As a result of the semantic segmentation, semantic meshes 430a, 430b can be created 410 within the scene such that the users 440a, 440b can visualize the boundaries (e.g., walls, a ceiling, and a floor) of the scene (e.g. room). The semantic meshes 430a, 430b can act as a collision warning 420 to the users 440a, 440b.

Figure 5:
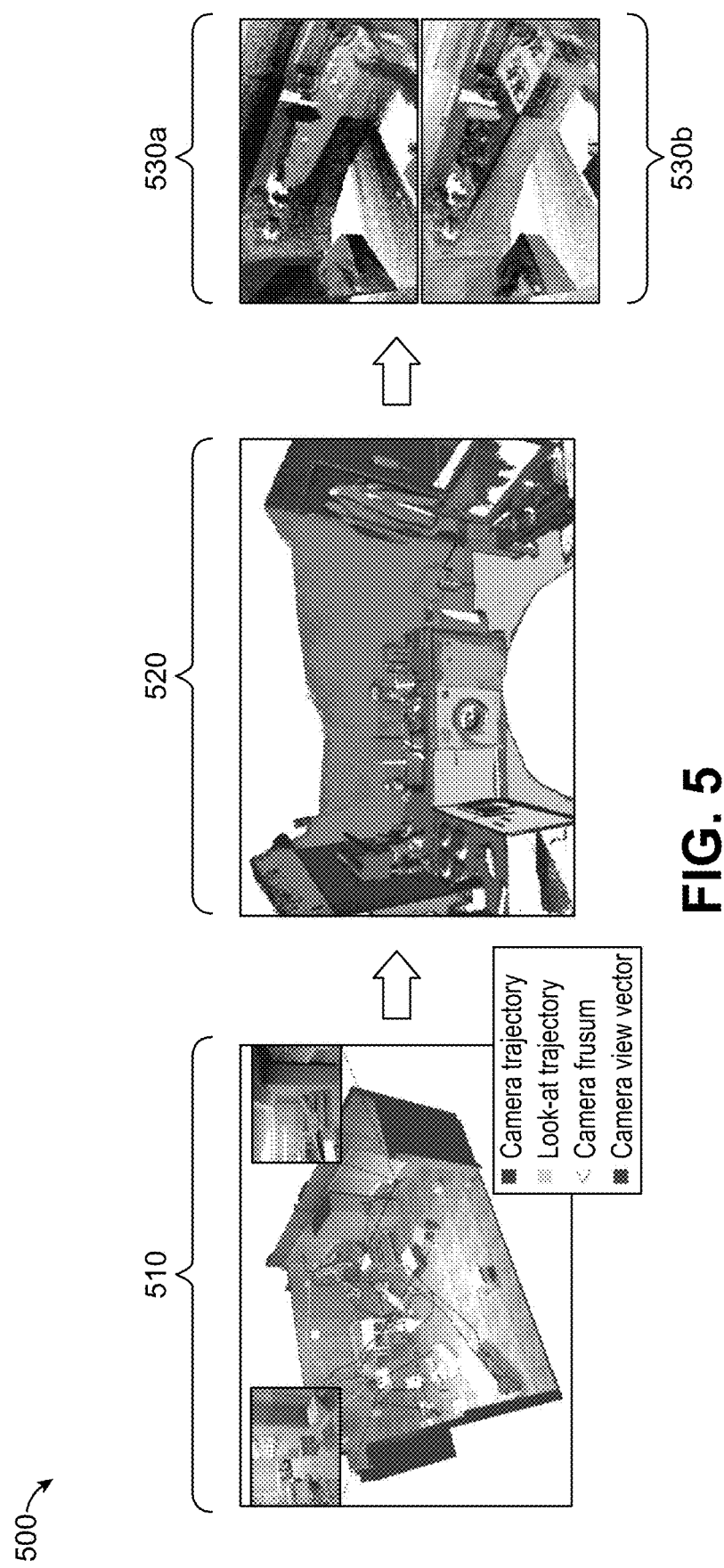
FIG. 5 is a diagram illustrating another example use case for using semantic segmentation for scene understanding, in accordance with some aspects of the present disclosure.

FIG. 5 shows another example of a use case 500 for semantic segmentation for scene understanding. In particular, FIG. 5 shows a use case 500 for semantic segmentation for scene understanding for providing indoor visual simultaneous location and mapping (SLAM) for robotics. In FIG. 5, a camera (e.g., on a robot) can perform SLAM to obtain images 510 of an indoor environment (e.g., a store) for the robot. One or more processors, such as ISP 150 of FIG. 5 or processor 1110 of FIG. 11. (e.g., on the robot) can perform 3D semantic reconstruction (e.g., semantic segmentation) using the obtained images to determine estimated (e.g., predicted) semantic information 520. The one or more processors (e.g., on the robot) can perform 3D semantic reconstruction using the estimated semantic information 520 to generate 3D semantic scenes 530a, 530b of the environment (e.g., the store). The 3D semantic scenes 530a, 530b can be used by the robot to understand objects and boundaries within its environment (e.g., the store).

In some cases (e.g., in cases of a tilted camera), the 3D semantic reconstruction (e.g., semantic segmentation) may provide inaccurate semantic labels (e.g., semantic classes), which can lead to misunderstandings of the scene. Various camera orientations and viewing directions can challenge the robustness of the semantic predictions. For example, extreme poses, viewing directions, and tilted images from a camera can lead to inaccurate semantic results, which can affect various scene-understanding tasks. For example, extreme rotations (e.g., in both pitch and roll) of a camera can be detrimental to scene understanding because the tilted images can have ambiguity and lack of contextual information that can cause the semantic segmentation methods to produce an inaccurate semantics output. Some existing solutions to overcome the issues of tilted images involve pre-processing the tilted images to un-tilt the images. However, these solutions require a longer processing time and can still lead to inaccurate semantic predictions.

Figure 6:
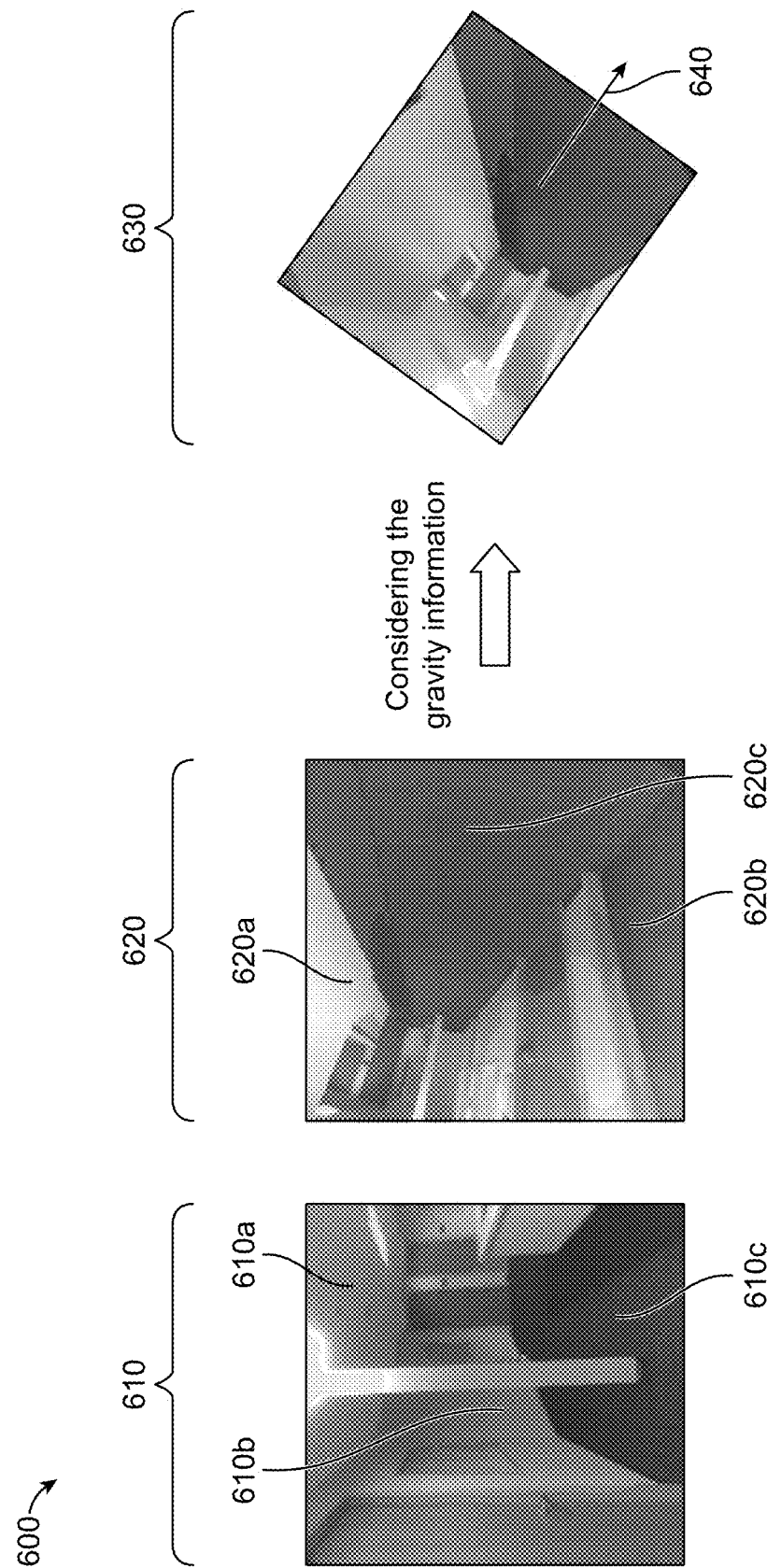
FIG. 6 is a diagram illustrating an example of a challenge on the robustness of semantic segmentation for scene understanding, in accordance with some aspects of the present disclosure.

FIG. 6 show an example 600 of a challenge on the robustness of semantic segmentation for scene understanding. In particular, FIG. 6 shows an example 600 of a tilted 620 image that, when used for performing semantic segmentation, can lead to inaccurate semantic labels (e.g., semantic classes).

In FIG. 6, a un-tilted image 610 of the scene (e.g., a room) is shown. One or more processors (e.g., ISP 150 of FIG. 5 or processor 1110 of FIG. 11) of a camera may perform semantic segmentation using the un-tilted image 610. The semantic segmentation can produce estimated (e.g., predicted) semantic labels (e.g., semantic classes) for the boundaries (e.g., walls, ceiling, and floor) of the scene (e.g., room). For example, the semantic segmentation using the un-tilted image 610 may accurately label a first grouping of pixels 610a within the image 610 with a semantic label of "ceiling", a second grouping of pixels 610b within the image 610 with a semantic label of "wall", and a third grouping of pixels 610c within the image 610 with a semantic label of "floor".

In FIG. 6, a tilted image 620 of the scene (e.g., room) is also shown. The one or more processors of the camera may perform semantic segmentation using the tilted image 620. However, the semantic segmentation using the tilted image 620 may inaccurately label a first grouping of pixels 620a within the image 620 with a semantic label of "ceiling" (e.g., the first grouping of pixels 620a should have a semantic label of "wall"), a second grouping of pixels 620b within the image 620 with a semantic label of "floor" (e.g., the second grouping of pixels 620b should have a semantic label of "wall"), and a third grouping of pixels 620c within the image 620 with a semantic label of "wall" (e.g., the third grouping of pixels 620c should have a semantic label of "floor").

FIG. 6 also shows a tilted image 630 of the scene (e.g., the room) with an associated gravity vector 640 for the scene. In one or more examples, the gravity vector 640 for the scene may be obtained from one or more IMU sensors (e.g., one more accelerometers and/or gyroscopes) on the camera, while one or more image sensors (e.g., image sensor 130 of FIG. 1) on the camera are capturing the image 630 of the scene. As previously mentioned, the systems and techniques may employ a gravity vector 640 for the scene to provide 3D information to the semantic segmentation method to increase the robustness (e.g., accuracy) of the method. The description of FIGS. 8 and 9 describes in detail how the gravity vector 640 is utilized.

FIG. 7 shows an example 700 of a challenge on the robustness of semantic segmentation for scene understanding. In particular, FIG. 7 is a diagram 700 showing an example of an existing semantic segmentation method 710 that has a lack of 3D knowledge. The lack of 3D knowledge in 2D semantic applications, such as semantic segmentation predictions from 2D color images (e.g., color images 730) without having sufficient 3D information, has limited space to improve. In FIG. 7, the existing semantic segmentation method 740 is shown to include a semantic segmentation model 740 (e.g., algorithm) that uses color images 730 to determine (e.g., generate) a semantic 2D map 750 (e.g., without the use of 3D information). However, utilizing 3D information (e.g., for conditioning), such as depth data and normal (e.g., normal vector) data, for existing semantic segmentation methods (e.g., existing semantic segmentation method 740) can often require extra complexity and run-time for the whole image processing pipeline.

FIG. 7 also shows an example of a disclosed semantic segmentation method 720 that utilizes 3D information. The disclosed semantic segmentation method 720 employs a multi-task model 770 (e.g., algorithm), which is a machine learning algorithm that utilizes a neural network (e.g., a DCN), that simultaneously learns the 3D information and the 2D information from the color images 760 of a scene to generate (e.g., output) a normal map 780 (e.g., including normal vectors for regions of the scene) in 3D, and a semantic map 790 (e.g., including semantic labels for the regions of the scene) in 2D. The disclosed semantic segmentation method 720, by utilizing 3D information of the scene, can provide more a robust (e.g., a more accurate) segmentation result.

In one or more aspects, the systems and techniques provide neural geometry-aware semantics segmentation with gravity-normal regularization. In one or more examples, the systems and techniques may utilize a gravity vector of a scene to provide 3D information to the semantic segmentation method to increase the robustness of the method. The systems and techniques can simultaneously determine (e.g., only during a training stage) normal predictions (e.g., predictions of normal vectors for classes, such as regions, which may include a floor, a ceiling, and walls) of the scene (e.g., of a room) and determine semantic predictions (e.g., semantic labels for the classes) for the scene.

In one or more aspects, the systems and techniques can employ a gravity-normal regularization that uses the gravity vector (e.g., which is perpendicular to the floor) as a parameter. The gravity-normal regularization involves the relationship between a semantics normal (e.g., normal vectors associated with regions of a scene) and the gravity vector for the scene. In one or more examples, the gravity vector for the scene may be obtained from one or more IMU sensors on a camera, while one or more image sensors on the camera are capturing the image(s) of the scene.

Figure 8:
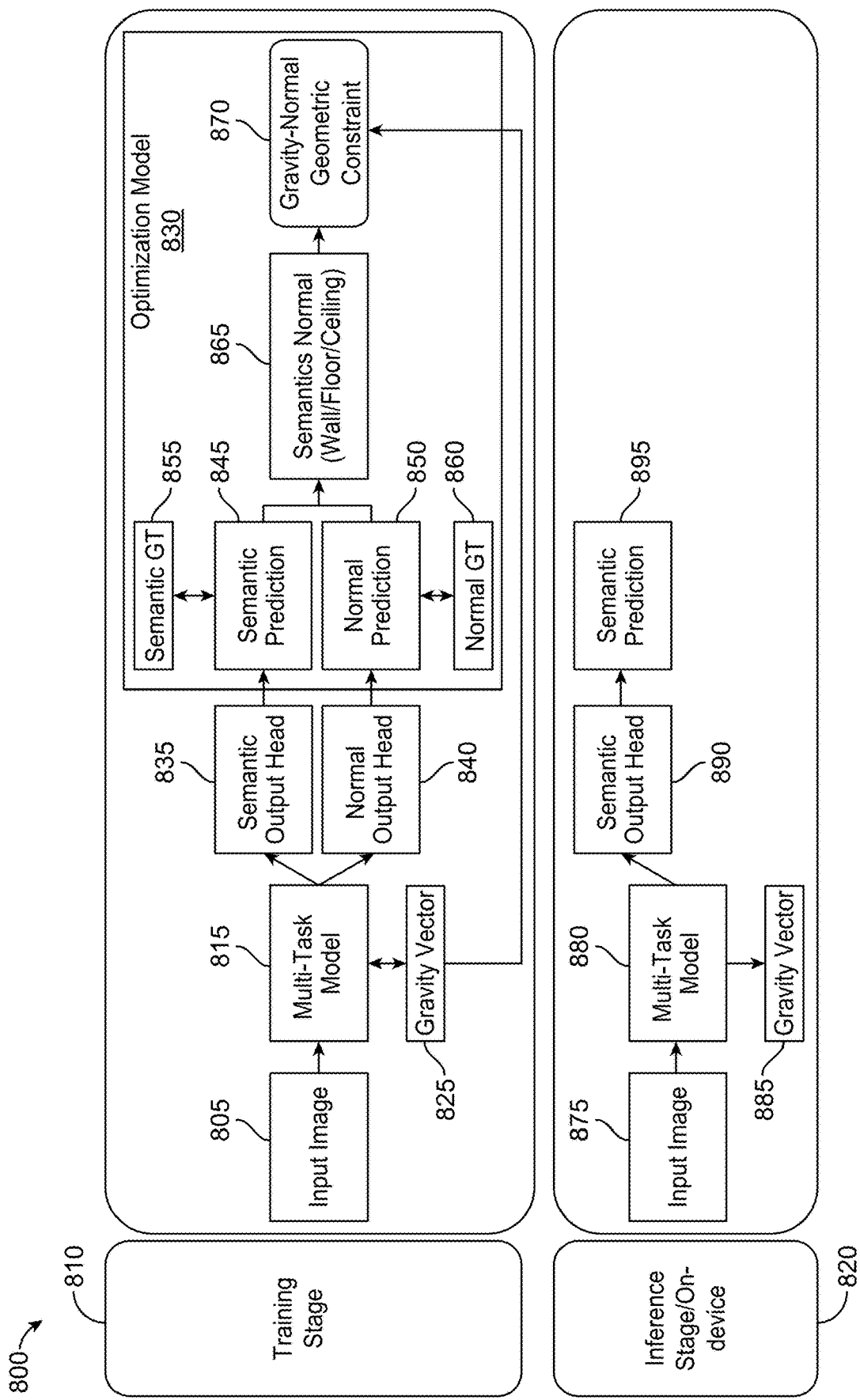
FIG. 8 is a diagram illustrating an example of a process for providing neural geometry-aware semantics segmentation with gravity-normal regularization, in accordance with some aspects of the present disclosure.

FIG. 8 shows an example process for providing neural geometry-aware semantics segmentation with gravity-normal regularization. In particular, FIG. 8 is a diagram illustrating an example of a process 800 for providing neural geometry-aware semantics segmentation with gravity-normal regularization. In FIG. 8, the process is shown to include a training stage 810 and an inference stage 820 (e.g., which may be performed on the device, such as a camera).

During operation of the training stage 810 of the process 800, images 805 (e.g., color images) of a scene and a gravity vector 825 for the scene may be input into a multi-task model 815. In one or more examples, the images 805 of a scene may be obtained (e.g., captured) from one or more image sensors (e.g., image sensor 130 of FIG. 1) of a device, such as a camera. In some examples, the gravity vector 825 may be obtained (e.g., measured) form one or more IMU sensors of the device (e.g., a camera).

In one or more examples, the multi-task model may be a machine learning algorithm that utilizes (e.g., includes) a neural network (e.g., a convolutional neural network). The multi-task model 815 can perform semantic segmentation using the images 805 (e.g., by extracting features form the images 805) and the gravity vector 825 (e.g., V gravity 990 of FIG. 9) to generate a segmentation output 835 (e.g., a semantic output head) and a normal output 840 (e.g., a normal output head). In one or more examples, the segmentation output 835 can include a semantic segmentation map in 2D that includes semantic labels for regions (e.g., ceiling 930, floor 950, and walls 940a, 940b of FIG. 9) of the scene (e.g., a room). In some examples, the normal output 840 can include a normal map in 3D that includes normal vectors (e.g., $n_{floor}$ vector 960, $n_{ceiling}$ vector 980, and $n_{wall}$ vector 970 of FIG. 9) associated with the regions (e.g., ceiling 930, floor 950, and walls 940a. 940b of FIG. 9) of the scene (e.g., the room).

In one or more examples, during the training stage 810, the segmentation output 835 and the normal output 840 can be input into an optimization model 830. In one or more examples, the optimization model 830 can learn (e.g., optimize) semantic predictions 845 based on comparing the segmentation output 835 to one or more ground truth semantic segmentation maps 855 (e.g., including semantic ground truths for the scene). The optimization model 830 can also learn (e.g., optimize) normal predictions 850 based on comparing the normal output 840 to one or more ground truth normal maps 860 (e.g., including normal ground truths for the scene). In one or more examples, the semantic predictions 845 can include a predicted sematic map including predictions of semantic labels for the regions of the scene. In some examples, the normal predictions 850 can include a predicted normal map including predictions of normal vectors of the regions of the scene.

In one or more examples, the optimization model 830 can simultaneously learn (e.g., optimize) the semantic predictions 845 and the normal predictions 850. In one or more examples, the optimization model 830 can learn the semantic predictions 845 by using a cross-entropy loss (e.g., for the semantic loss ($L_{semantic}$)) for the comparison of the segmentation output 835 to one or more ground truth semantic segmentation maps 855, and can learn the normal predictions 850 by using a L1-normal (L1-norm) loss (e.g., for the normal loss ($L_{normal}$)) for the comparison of the normal output 840 to one or more ground truth normal maps 860.

In one or more examples, the optimization model 830 can extract a semantics normal 865 from the semantic predictions 845 and the normal predictions 850. In some examples, the semantics normal 865 can include normal vectors of the regions (e.g., ceiling, floor, and walls) of the scene. The optimization model 830 can optimize a regularization loss (e.g., $L_{opt}$), based on the semantics normal 865 and the gravity vector 825, by learning gravity-normal regularizations 870 (e.g., gravity-normal constraints) for the scene. In one or more examples, the regularization loss is based on calculating inner products between normal vectors of the regions (e.g., ceiling, floor, and walls) of the scene and the gravity vector.

Figure 9:
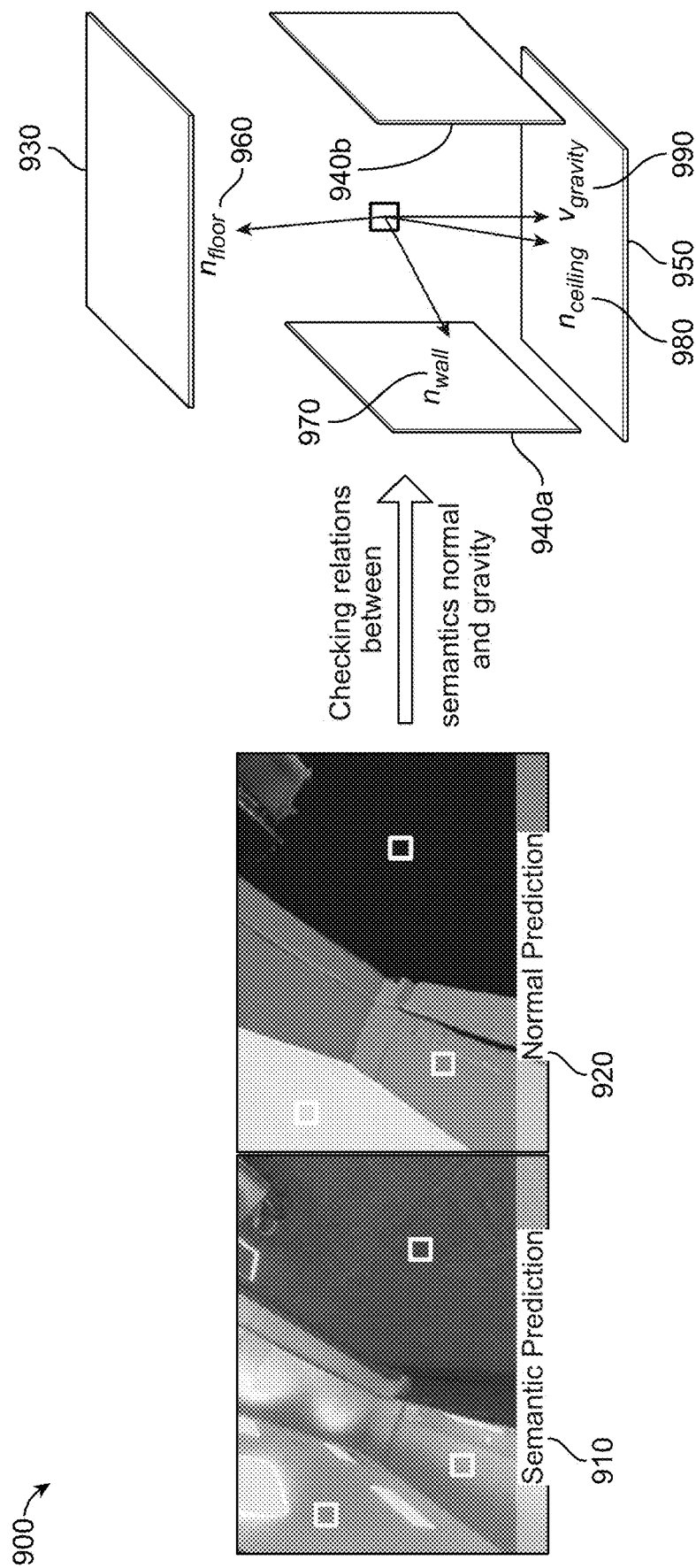
FIG. 9 is a diagram illustrating an example of gravity-normal regularization, in accordance with some aspects of the present disclosure.

FIG. 9 is a diagram illustrating an example 900 of gravity-normal regularization. In FIG. 9, an example semantic prediction 910 and an example normal prediction 920 are shown. FIG. 9 also shows a graphical representation of the scene including the normal vectors (e.g., $n_{floor}$ vector 960, $n_{ceiling}$ vector 980, and $n_{wall}$ vector 970) of the regions (e.g., ceiling 930, floor 950, and walls 940a, 940b) of the scene, and the gravity vector (e.g., $v_{gravity}$ 990) for the scene.

In one or more examples, the regularization loss (e.g., $L_{opt}$) can be obtained by using a dot product (e.g., an inner product) to calculate the differences between pairs of vectors. In one or more examples, if two vectors are parallel, the dot product should be close to one (1) or negative one (−1). For example, if the normal vector for the ceiling (e.g., $n_{ceiling}$ vector 980) is parallel with the gravity vector (e.g., $v_{gravity}$ 990), the dot product should be close to one. In one or more examples, if the two vectors are perpendicular, the dot product should be close to zero (0). For example, if the normal vector for the wall (e.g., $n_{wall}$ vector 970) is perpendicular with the gravity vector (e.g., $v_{gravity}$ 990), the dot product should be close to zero. As such, the equation for the loss between the normal vector and the gravity vector can be expressed as:

$$L_{gn} = [1 + dot(n_{floor}, n_{gravity})] + [1 - dot(n_{ceiling}, n_{gravity})] + dot(n_{gravity}, n_{wall})$$

The equation for the loss between the predicted normal itself can be expressed as:

$$L_{sn} = [1 + dot(n_{floor}, n_{ceiling})] + dot(n_{ceiling}, n_{wall}) + dot(n_{floor}, n_{wall})$$

The equation for the total regularization loss can be expressed as:

$$L_{opt} = L_{semantic} + L_{normal} + L_{gn} + L_{sn}$$

Referring back to FIG. 8, the optimization model 830 can optimize the regularization loss (e.g., $L_{opt}$) to be as close to zero as possible, by learning the gravity-normal regularizations 870 (e.g., gravity-normal constraints) for the scene.

In one or more examples, after the training stage 810 has been performed, during the inference stage 820 (e.g., which may be performed on the device, such as the camera), images 875 (e.g., color images) of a scene and a gravity vector 885 for the scene can be input into a multi-task model 880, which may be a machine learning algorithm that utilizes (e.g., includes) a neural network (e.g., a convolutional neural network). The multi-task model 880 can perform semantic segmentation using the images 875 (e.g., by extracting features form the images 875) and the gravity vector 885 (e.g., $v_{gravity}$ 990 of FIG. 9) to generate a segmentation output 890 (e.g., a semantic output head). The segmentation output 890 can include a semantic segmentation map in 2D that includes semantic labels for regions (e.g., ceiling 930, floor 950, and walls 940a, 940b of FIG. 9) of the scene (e.g., a room).

In one or more examples, the segmentation output 890 can be input into the trained optimization model, which has been trained for gravity-normal regularizations. The trained optimization model can determine semantic predictions 895 based on the segmentation output 890. In one or more examples, the semantic predictions 895 can include a final predicted semantic map that includes final predictions of semantic labels (e.g., final semantic labels) for the regions of the scene.

Figure 10:
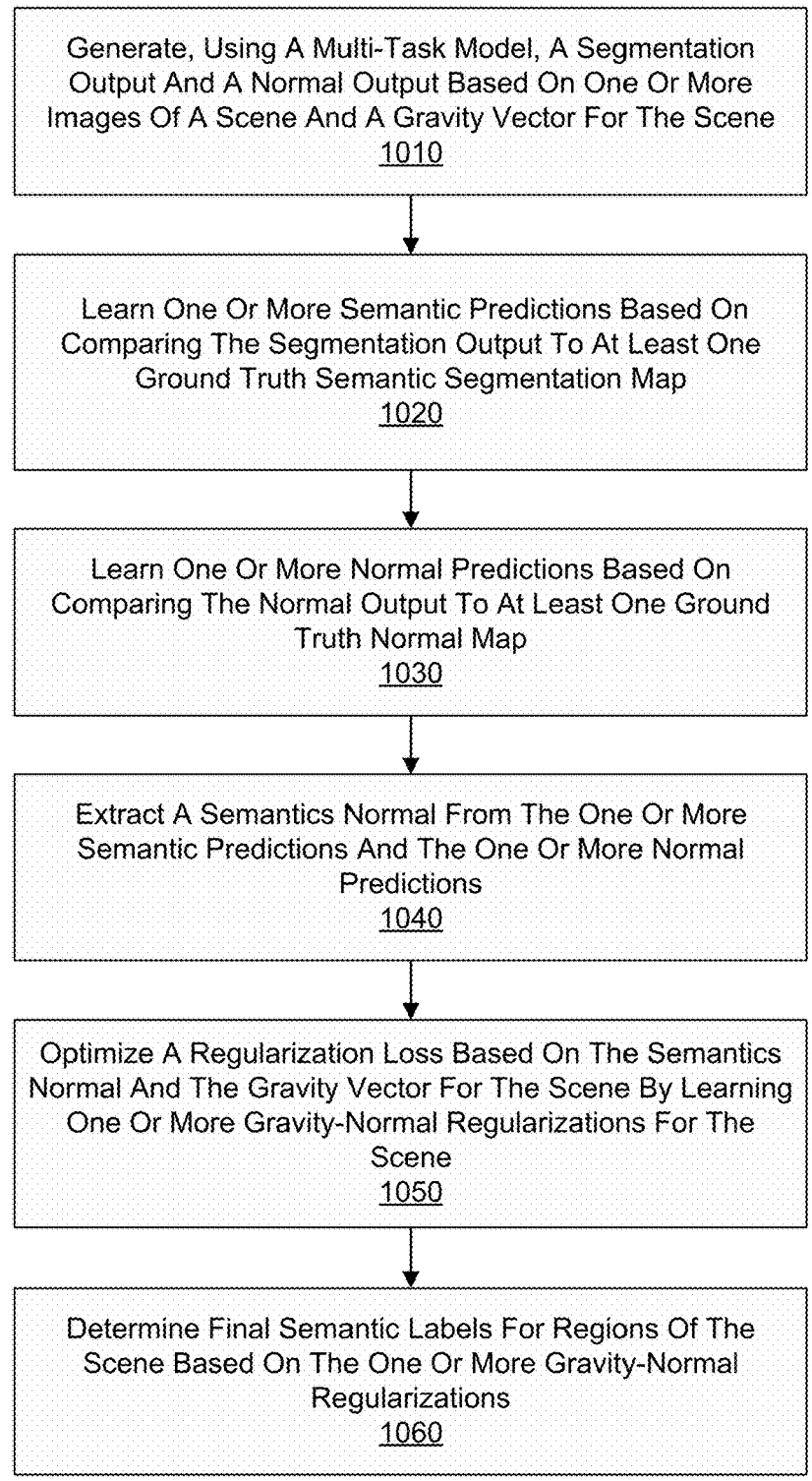
FIG. 10 is a flow chart illustrating an example of a process for image processing, in accordance with some aspects of the present disclosure.

FIG. 10 is a flow diagram illustrating a process for image processing, in accordance with aspects of the present disclosure. The process 1000 may be performed by a computing device (or apparatus) or a component (e.g., a chipset, codec, etc.) of the computing device, such as image capturing and processing system 100 of FIG. 1 and/or computing system 1100 of FIG. 11. The computing device may be a mobile device (e.g., a mobile phone), a tablet computer, a camera device (e.g., a digital camera), a network-connected wearable device such as a watch, an extended reality (XR) device such as a virtual reality (VR) device, augmented reality (AR), or mixed reality (MR) device, a vehicle or component or system of a vehicle, or other type of computing device. The operations of the process 1000 may be implemented as software components that are executed and run on one or more processors (e.g., the image processor 150 of FIG. 1, the host processor 152 of FIG. 1, processor 1110 of FIG. 11, and/or other processor(s)). In some cases, the operations of the process 1000 can be implemented by a system having the architecture of the computing system 1100 of FIG. 11.

At block 1010, the computing device (or component thereof) can generate, using a multi-task model (e.g., multi-task model 815 of FIG. 8, which in some cases can be a neural network, such as a convolutional neural network, as described herein), a segmentation output and a normal output based on one or more images (e.g., input image 805 of FIG. 8) of a scene and a gravity vector (e.g., gravity vector 825 of FIG. 8) for the scene. In some cases, the computing device (or component thereof) can use the multi-task model to extract features from the one or more images to generate the segmentation output and the normal output. For instance, the features extracted by the multi-task model 815 can be used by the semantic output head 835 to generate the segmentation output and can be used by the normal output head 840 to generate the normal output. In some examples, the segmentation output includes a semantic segmentation map including semantic labels for the regions of the scene. In some examples, the normal output includes a normal map including normal vectors associated with the regions of the scene.

In some aspects, the computing device (or component thereof) can obtain the one or more images of the scene from an image sensor (e.g., the image sensor 130 of FIG. 1) of a camera. In some cases, the computing device (or component thereof) can obtain the gravity vector from one or more inertial measurement unit (IMU) sensors of a camera. For instance, the gravity vector for the scene can be obtained from the one or more IMU sensors on a camera (or a device including the camera, such as the computing device) while the one or more image sensors on the camera are capturing the image(s) of the scene.

At block 1020, the computing device (or component thereof) can learn one or more semantic predictions based on comparing the segmentation output to at least one ground truth semantic segmentation map. In some cases, the one or more semantic predictions include a predicted semantic map including predictions of semantic labels for the regions of the scene. In one illustrative example, as described previously with respect to FIG. 8, the optimization model 830 can learn (e.g., optimize) semantic predictions 845 based on comparing the segmentation output 835 to one or more ground truth semantic segmentation maps 855 (e.g., including semantic ground truths for the scene).

At block 1030, the computing device (or component thereof) can learn one or more normal predictions based on comparing the normal output to at least one ground truth normal map. In some examples, the one or more normal predictions include a predicted normal map including predictions of normal vectors of the regions of the scene. In one illustrative example, as described previously with respect to FIG. 8, the optimization model 830 can learn (e.g., optimize) normal predictions 850 based on comparing the normal output 840 to one or more ground truth normal maps 860 (e.g., including normal ground truths for the scene). In some aspects, the one or more semantic predictions and the one or more normal predictions are learned using an optimization model.

At block 1040, the computing device (or component thereof) can extract a semantics normal (e.g., the semantics normal 865 of FIG. 8) from the one or more semantic predictions and the one or more normal predictions. In some cases, the semantics normal includes normal vectors associated with the regions of the scene At block 1050, the computing device (or component thereof) can optimize a regularization loss based on the semantics normal and the gravity vector for the scene by learning one or more gravity-normal regularizations for the scene. In one illustrative example, as described previously with respect to FIG. 8, the optimization model 830 can optimize a regularization loss (e.g., $L_{opt}$), based on the semantics normal 865 and the gravity vector 825, by learning gravity-normal regularizations 870 (e.g., gravity-normal constraints) for the scene. In some aspects, the regularization loss is based on inner products calculated between normal vectors of the regions of the scene and the gravity vector.

At block 1060, the computing device (or component thereof) can determine final semantic labels for regions of the scene based on the one or more gravity-normal regularizations.

In some examples, the computing device may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1000 is illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1000 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

FIG. 11 is a block diagram illustrating an example of a computing system 1100, which may be employed by the disclosed systems and techniques for providing neural geometry-aware semantics segmentation with gravity-normal regularization. In particular, FIG. 11 illustrates an example of computing system 1100, which can be, for example, any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100.

Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1140 may also include one or more range sensors (e.g., LIDAR sensors, laser range finders, RF radars, ultrasonic sensors, and infrared (IR) sensors) configured to collect data and provide measurements to processor 1110, whereby processor 1110 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods, algorithms, and/or operations described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus for image processing, the apparatus comprising: at least one memory; and at least one processor coupled to the at least one memory and configured to: generate, using a multi-task model, a segmentation output and a normal output based on one or more images of a scene and a gravity vector for the scene; learn one or more semantic predictions based on comparing the segmentation output to at least one ground truth semantic segmentation map; learn one or more normal predictions based on comparing the normal output to at least one ground truth normal map; extract a semantics normal from the one or more semantic predictions and the one or more normal predictions; optimize a regularization loss based on the semantics normal and the gravity vector for the scene by learning one or more gravity-normal regularizations for the scene; and determine final semantic labels for regions of the scene based on the one or more gravity-normal regularizations.

Aspect 2. The apparatus of Aspect 1, wherein the at least one processor is configured to obtain, from an image sensor of a camera, the one or more images of the scene.

Aspect 3. The apparatus of any one of Aspects 1 to 2, wherein the at least one processor is configured to obtain, from one or more inertial measurement unit (IMU) sensors of a camera, the gravity vector.

Aspect 4. The apparatus of any one of Aspects 1 to 3, wherein the at least one processor is configured to use the multi-task model to extract features from the one or more images to generate the segmentation output and the normal output.

Aspect 5. The apparatus of any one of Aspects 1 to 4, wherein the segmentation output comprises a semantic segmentation map comprising semantic labels for the regions of the scene.

Aspect 6. The apparatus of any one of Aspects 1 to 5, wherein the normal output comprises a normal map comprising normal vectors associated with the regions of the scene.

Aspect 7. The apparatus of any one of Aspects 1 to 6, wherein the one or more semantic predictions comprise a predicted semantic map comprising predictions of semantic labels for the regions of the scene.

Aspect 8. The apparatus of any one of Aspects 1 to 7, wherein the one or more normal predictions comprise a predicted normal map comprising predictions of normal vectors of the regions of the scene.

Aspect 9. The apparatus of any one of Aspects 1 to 8, wherein the semantics normal comprises normal vectors associated with the regions of the scene.

Aspect 10. The apparatus of any one of Aspects 1 to 9, wherein the regularization loss is based on inner products calculated between normal vectors of the regions of the scene and the gravity vector.

Aspect 11. The apparatus of any one of Aspects 1 to 10, wherein the multi-task model comprises a neural network.

Aspect 12. The apparatus of Aspect 11, wherein the neural network is a convolutional neural network.

Aspect 13. The apparatus of any one of Aspects 1 to 12, wherein the one or more semantic predictions and the one or more normal predictions are learned using an optimization model.

Aspect 14. A method for image processing, the method comprising: generating, using a multi-task model, a segmentation output and a normal output based on one or more images of a scene and a gravity vector for the scene; learning one or more semantic predictions based on comparing the segmentation output to at least one ground truth semantic segmentation map; learning one or more normal predictions based on comparing the normal output to at least one ground truth normal map; extracting a semantics normal from the one or more semantic predictions and the one or more normal predictions; optimizing a regularization loss based on the semantics normal and the gravity vector for the scene by learning one or more gravity-normal regularizations for the scene; and determining final semantic labels for regions of the scene based on the one or more gravity-normal regularizations.

Aspect 15. The method of Aspect 14, further comprising obtaining, from an image sensor of a camera, the one or more images of the scene.

Aspect 16. The method of any one of Aspects 14 or 15, further comprising obtaining, from one or more inertial measurement unit (IMU) sensors of a camera, the gravity vector.

Aspect 17. The method of any one of Aspects 14 to 16, wherein the multi-task model generates the segmentation output and the normal output by extracting features from the one or more images.

Aspect 18. The method of any one of Aspects 14 to 17, wherein the segmentation output comprises a semantic segmentation map comprising semantic labels for the regions of the scene.

Aspect 19. The method of any one of Aspects 14 to 18, wherein the normal output comprises a normal map comprising normal vectors associated with the regions of the scene.

Aspect 20. The method of any one of Aspects 14 to 19, wherein the one or more semantic predictions comprise a predicted semantic map comprising predictions of semantic labels for the regions of the scene.

Aspect 21. The method of any one of Aspects 14 to 20, wherein the one or more normal predictions comprise a predicted normal map comprising predictions of normal vectors of the regions of the scene.

Aspect 22. The method of any one of Aspects 14 to 21, wherein the semantics normal comprises normal vectors associated with the regions of the scene.

Aspect 23. The method of any one of Aspects 14 to 22, wherein the regularization loss is based on calculating inner products between normal vectors of the regions of the scene and the gravity vector.

Aspect 24. The method of any one of Aspects 14 to 23, wherein the multi-task model comprises a neural network.

Aspect 25. The method of Aspect 24, wherein the neural network is a convolutional neural network.

Aspect 26. The method of any one of Aspects 14 to 25, wherein the one or more semantic predictions and the one or more normal predictions are learned using an optimization model.

Aspect 27. A non-transitory computer-readable medium having stored thereon instructions that, when executed by one or more processors, cause the one or more processors to perform operations according to any of Aspects 14 to 26.

Aspect 28: An apparatus for image processing, including one or more means for performing operations according to any of Aspects 14 to 26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for image processing, the apparatus comprising:
   at least one memory; and
   at least one processor coupled to the at least one memory and configured to:
   generate, using a multi-task model, a segmentation output and a normal output based on one or more images of a scene and a gravity vector for the scene;
   learn one or more semantic predictions based on comparing the segmentation output to at least one ground truth semantic segmentation map;
   learn one or more normal predictions based on comparing the normal output to at least one ground truth normal map;
   extract a semantics normal from the one or more semantic predictions and the one or more normal predictions;
   optimize a regularization loss based on the semantics normal and the gravity vector for the scene by learning one or more gravity-normal regularizations for the scene, wherein the regularization loss is based on inner products calculated between normal vectors of the regions of the scene and the gravity vector; and
   determine final semantic labels for regions of the scene based on the one or more gravity-normal regularizations.

2. The apparatus of claim 1, wherein the at least one processor is configured to obtain, from an image sensor of a camera, the one or more images of the scene.

3. The apparatus of claim 1, wherein the at least one processor is configured to obtain, from one or more inertial measurement unit (IMU) sensors of a camera, the gravity vector.

4. The apparatus of claim 1, wherein the at least one processor is configured to use the multi-task model to extract features from the one or more images to generate the segmentation output and the normal output.

5. The apparatus of claim 1, wherein the segmentation output comprises a semantic segmentation map comprising semantic labels for the regions of the scene.

6. The apparatus of claim 1, wherein the normal output comprises a normal map comprising normal vectors associated with the regions of the scene.

7. The apparatus of claim 1, wherein the one or more semantic predictions comprise a predicted semantic map comprising predictions of semantic labels for the regions of the scene.

8. The apparatus of claim 1, wherein the one or more normal predictions comprise a predicted normal map comprising predictions of normal vectors of the regions of the scene.

9. The apparatus of claim 1, wherein the semantics normal comprises normal vectors associated with the regions of the scene.

10. The apparatus of claim 1, wherein the one or more semantic predictions and the one or more normal predictions are learned using an optimization model.

11. The apparatus of claim 1, wherein the multi-task model comprises a neural network.

12. The apparatus of claim 11, wherein the neural network is a convolutional neural network.

13. A non-transitory computer-readable medium having stored thereon instructions that, when executed by one or more processors, cause the one or more processors to:
generate, using a multi-task model, a segmentation output and a normal output based on one or more images of a scene and a gravity vector for the scene;
learn one or more semantic predictions based on comparing the segmentation output to at least one ground truth semantic segmentation map;
learn one or more normal predictions based on comparing the normal output to at least one ground truth normal map;
extract a semantics normal from the one or more semantic predictions and the one or more normal predictions;
optimize a regularization loss based on the semantics normal and the gravity vector for the scene by learning one or more gravity-normal regularizations for the scene, wherein the regularization loss is based on inner products calculated between normal vectors of the regions of the scene and the gravity vector; and
determine final semantic labels for regions of the scene based on the one or more gravity-normal regularizations.

14. A method for image processing, the method comprising:
generating, using a multi-task model, a segmentation output and a normal output based on one or more images of a scene and a gravity vector for the scene;
learning one or more semantic predictions based on comparing the segmentation output to at least one ground truth semantic segmentation map;
learning one or more normal predictions based on comparing the normal output to at least one ground truth normal map;
extracting a semantics normal from the one or more semantic predictions and the one or more normal predictions;
optimizing a regularization loss based on the semantics normal and the gravity vector for the scene by learning one or more gravity-normal regularizations for the scene, wherein the regularization loss is based on calculating inner products between normal vectors of the regions of the scene and the gravity vector; and
determining final semantic labels for regions of the scene based on the one or more gravity-normal regularizations.

15. The method of claim 14, further comprising obtaining, from an image sensor of a camera, the one or more images of the scene.

16. The method of claim 14, further comprising obtaining, from one or more inertial measurement unit (IMU) sensors of a camera, the gravity vector.

17. The method of claim 14, wherein the multi-task model generates the segmentation output and the normal output by extracting features from the one or more images.

18. The method of claim 14, wherein the segmentation output comprises a semantic segmentation map comprising semantic labels for the regions of the scene.

19. The method of claim 14, wherein the normal output comprises a normal map comprising normal vectors associated with the regions of the scene.

20. The method of claim 14, wherein the one or more semantic predictions comprise a predicted semantic map comprising predictions of semantic labels for the regions of the scene.

21. The method of claim 14, wherein the one or more normal predictions comprise a predicted normal map comprising predictions of normal vectors of the regions of the scene.

22. The method of claim 14, wherein the semantics normal comprises normal vectors associated with the regions of the scene.

23. The method of claim 14, wherein the one or more semantic predictions and the one or more normal predictions are learned using an optimization model.

24. The method of claim 14, wherein the multi-task model comprises a neural network.

25. The method of claim 24, wherein the neural network is a convolutional neural network.

* * * * *